Patented Oct. 19, 1943

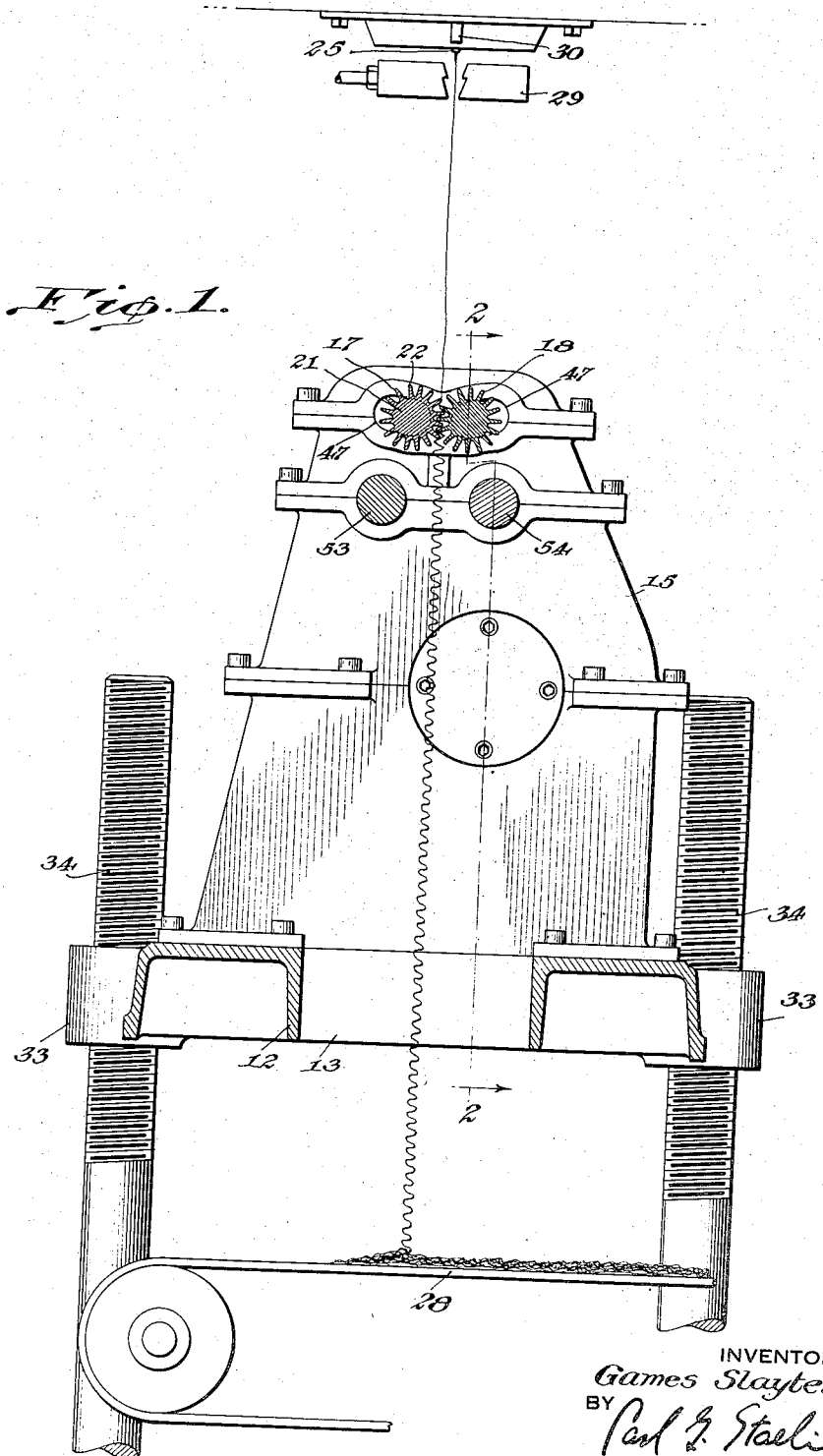

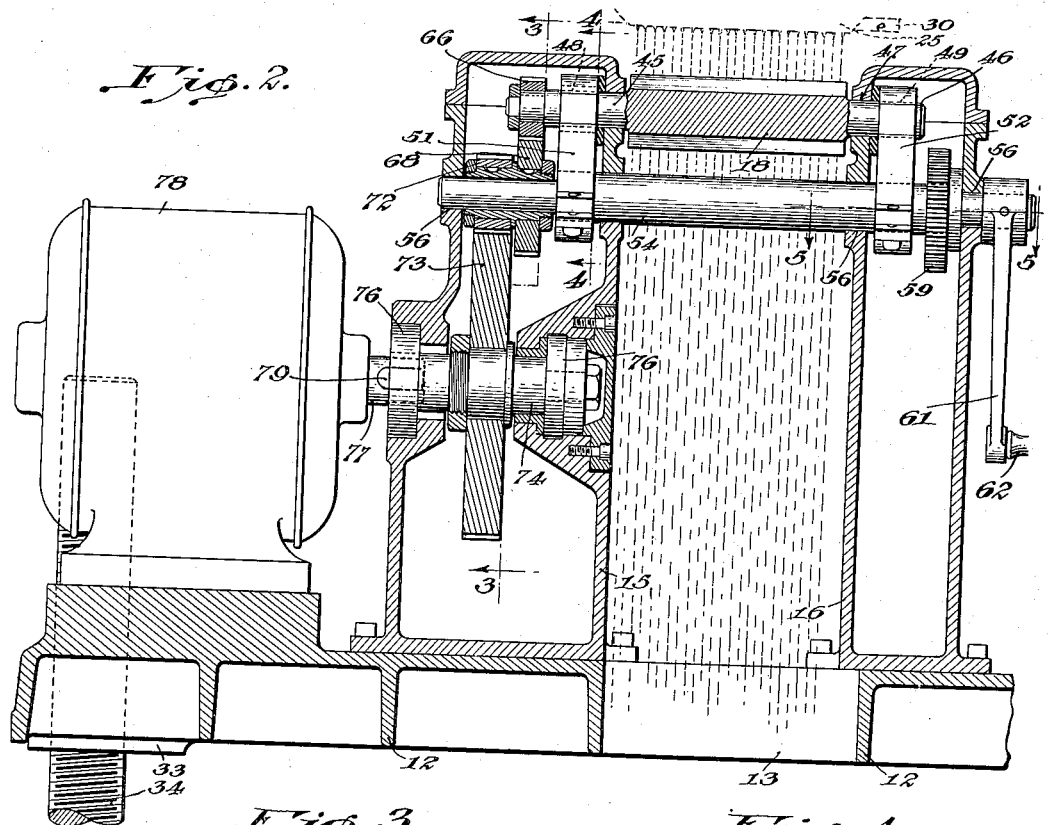

2,332,274

UNITED STATES PATENT OFFICE 2,332,274

FIBER FORMING APPARATUS

Games Slayter, Newark, Ohio, assignor to Owens-Corning Fiberglas Corporation, a corporation of Delaware Application February 1, 1941, Serial No. 377,059

5 Claims. (Cl. 49—17)

The present invention relates to fiber forming apparatus and particularly to mechanism for attenuating viscous glass streams.

My copending application, Serial Number 223,104, filed August 4, 1938, now Patent No. 2,230,272, of which the present application is a continuation in part, discloses the method of forming fibers from streams by engaging the streams at opposite sides by rotating members having circumferentially spaced projections that bend the streams back and forth and apply tractive forces thereto to attenuate them and form straight or crimped fibers as desired.

It is an object of the present invention to provide improved apparatus for attenuating streams of viscous glass or similar material, that is compact and comprises a relatively few number of parts. Apparatus of this character is subjected to elevated temperatures and to the action of abrasive material since it operates on molten glass. The use of relatively few parts compactly arranged permits protectively enclosing them and provides easy maintenance of the apparatus.

It is another object of the invention to provide driving mechanism for the attenuating members capable of rotating the members at high speeds and of multiplying the speed of an ordinary prime mover many times with a comparatively small number of gears. This reduces friction and the vibration that would otherwise limit the speed of the attenuating members.

It is another object of the present invention to provide driving mechanism for the attenuating members that will be capable of high speed operation with a minimum of back-lash. The attenuating rotors are driven in positive synchronism so that the teeth on coacting members move in accurate registry with the spaces on the other member. Drift of the members relative to each other is minimized, thereby assuring that the teeth on the respective attenuating members are maintained uniformly spaced and out of mutual contact with each other.

It is a further object to provide journaling and supporting means for the attenuating members operable to move the members in consonance into and out of intermeshing relation.

It is a further object of the invention to provide driving mechanism associated with the journaling and supporting means for the attenuating members in a manner to permit movement of the members into and out of coacting relation without interrupting the drive connection.

It is a still further object to provide apparatus of the character described in which all of the attenuating rotor operating mechanism is substantially fully enclosed. Particles of glass are thereby excluded from the bearings and gears and the mechanism may be amply lubricated without leakage of the lubricant onto the fibrous glass.

In the drawings:

Figure 1 is a central vertical cross-sectional view of apparatus embodying the present invention, shown in connection with a bushing for feeding glass streams.

Figure 2 is a vertical longitudinal section taken in the plane of the line 2—2 of Figure 1.

Figure 3 is a cross-sectional view taken in the plane of the line 3—3 of Figure 2.

Figure 4 is a similar view taken on the line 4—4 of Figure 2.

Figure 5 is a horizontal sectional view on the line 5—5 of Figure 2.

Figure 6 is an enlarged fragmentary elevational view illustrating the intermeshing relation of the attenuating members.

The present embodiment of the invention comprises a platform 12 of rectangular form constituting a base and provided with a central opening 13. Housing standards 15, 16 are fixed to the platform at opposite end margins of the central opening and extend upwardly from the platform in spaced relation. Attenuating members 17, 18 in the form of rotors, each comprises central cylindrical core portions 21 having projections or teeth 22 extending substantially radially therefrom. The attenuating rotors extend between the housing standards and are arranged with their teeth in intermeshing relation but out of mutual contact to receive glass streams therebetween. They are supported and rotatably driven in the manner hereinafter described.

The platform 12 is arranged beneath a suitable bushing 25 adapted to feed molten glass from a plurality of orifices in relatively small streams. The orifices are preferably disposed in one or more rows extending parallel with the axes of the attenuating rotors. The rotors 17, 18 are located beneath the outlet orifices of the bushing preferably one at each side of the vertical plane of the orifices, to receive between them the streams flowing from the bushing. Rotation of the rotors causes the teeth thereof to engage the streams at opposite sides and bend them back and forth while applying tractive force to the streams to attenuate them into fibers. The fibers are either crimped or straight depending upon the temperature of the glass at the point of engagement with the rotors, since if the glass is no longer plastic, the streams are bent back and forth but not permanently deformed.

The fibers, after leaving the attenuating members, move downwardly in haphazard and intertangled relation through the central opening in the platform 12 and are collected in the form of a mat on the surface of a conveyor 28. The mat is then compacted by being passed under a pressure roller or in other suitable manner. The illustration of the fibers and streams in the drawings is more or less schematic since it is almost impossible accurately to depict the very small streams and the fibers in their flight to the conveyor.

A suitable blower 29 may be provided adjacent the lower end of the bushing and arranged to direct a blast of cooling gas onto the streams flowing from the bushing. The bushing may be heated in suitable manner as by means of electric current from a source connected with terminals 30 at opposite ends of the bushing.

The platform 12 is preferably vertically adjustable to adjust the distance between the bushing and the attenuating rotors and thereby serve as one means for varying the temperature of the glass streams to form either crimped or straight fibers. For this purpose, the platform may be provided at the four corners thereof with hollow internally threaded bosses 33. Vertically disposed screws 34 are threaded through the bearings in the bosses and when rotated by suitable means act to raise or lower the platform.

The attenuating rotors 17, 18 are supportingly journaled by being each provided with stud shafts 45, 46 at their respective opposite ends, which extend through slots 47 in the inner walls of the housings 15, 16. The stud shafts of each of the attenuating members are journaled in bearings 48, 49 respectively in the outer ends of arms 51, 52 located within the housing. The arms are clamped at their inner ends to rock shafts 53, 54 extending through both housings 15, 16 and across the space between the housings and journaled in bearings 56 in the outer and inner walls of the housings.

The slots 47 in the inner walls of the standards are arcuate, each being described about the axis of one of the rock shafts as a center. Rotation of the rock shafts respectively in opposite directions causes movement of the attenuating members toward and from each other to move them into and out of coacting or meshing relation and toward and from stream engaging position, with the stud shafts moving in the arcuate slots. The rock shafts are caused to move in consonance in opposite directions by means of meshing gears 58, 59 fixed to the shafts. One of the rock shafts, for instance, the shaft 54, extends outwardly from the wall of the housing where it has a lever 61 fixed thereon, which is provided with a handle 62 at its outer end. Angular movement of the lever causes rotation of the rock shafts to thereby move the attenuating members into and out of meshing relation.

Each of the arms 51, 52 is provided at its upper end with a contact face 63, these faces engaging each other when the attenuating rotors are in fully meshed relation, and acting as a stop for inward movement of the rotors. Outward movement of the rotors is limited by the outer ends of the arcuate slots.

The driving means for the attenuating rotors is enclosed within the housing 15 and comprises pinions 65, 66 keyed to the ends of the respective stud shafts 45 of the rotors 17, 18. The pinions are in mesh respectively with gears 67, 68 keyed to sleeves 69, 70 rotatably journaled on the rock shafts 53, 54. The gears 67, 68 are in intermeshing relation so that they and the pinions on the attenuating members rotate in unison.

One of the sleeves, for instance, the sleeve 70, is provided with a pinion 72 keyed thereto. The pinion 72 is in meshing relation with a large driving gear 73 rotatively mounted on a drive shaft 74. The drive shaft is journaled at its ends in bearings 76 in the opposite walls of the housing 15. The shaft 74 has drive connection with the shaft 77 of an electric motor 78 mounted on the platform 12. The connection between the motor shaft and the shaft 74 is in the form of a flattened end 79 on the motor shaft received in a similarly shaped recess in the end of the shaft 74.

Rotation of the gear 73 with the motor-driven shaft 74 causes high speed rotation of the pinion 72 and with it the sleeve 70 and the intermeshing gears 67 and 68. These gears by their meshing relation with each other and with the smaller pinions 65 and 66 cause synchronous rotation of the attenuating rotors at increased speed.

The pinions 65, 66 on the attenuating members each mesh with one of a pair of gears that are in intermeshing relation, so that the possibility for back-lash and play is only at three points. This drive prevents interference between the projections on the attenuating rotors and eliminates or holds to a minimum the relative drift between the attenuating rotors. The teeth of one rotor are received centrally between the teeth of the other rotor so that there is free passage of the streams between the rotors without undue compression of the streams by the teeth.

A total of only six gears is employed to drive the two rotors, so arranged that the speed of the attenuating rotors is approximately eight times the speed of the electric motor. Vibration at this high speed is minimized by the small number of moving parts.

Various modifications may be resorted to within the spirit of the invention and the scope of the appended claims.

I claim:

1. In apparatus for attenuating streams of molten glass, the combination of a pair of intermeshing parallelly disposed gear-shaped attenuating rotors provided with circumferentially spaced intermeshing projections and each provided with end journal portions, a rotatably supported rock shaft for each of said rotors in parallell relation therewith, a pair of arms on each of said rock shafts spaced apart a distance corresponding to the spacing of said journal portions, the arms of each pair being fixed at one of their ends to their associated rock shaft and provided at their outer ends with bearings for said journal portions for rotatably supporting each of said rotors in fixed spaced relation to its associated rock shaft, intermeshing gears fixed on said rock shafts to cause them to move angularly in opposite directions in consonance, and manual means for oscillating one of said rock shafts to cause movement of said attenuating rotors into and out of meshing relation.

2. In apparatus for attenuating streams of molten glass, the combination of a pair of parallelly disposed attenuating rotors provided with intermeshing substantially radial projections and each having end journal portions, a rotatably supported rock shaft for each of said rotors in parallel relation therewith, a pair of arms on each of said rock shafts spaced apart a distance corresponding to the spacing of said journal portions, the arms of each pair being fixed at one of their ends to their associated rock shaft and provided at their outer ends with bearings for said journal portions for rotatably supporting each rotor in fixed spaced relation to its associated rock shaft, intermeshing gears fixed on said rock shafts to cause them to move angularly in opposite directions in consonance, a hand lever fixed to one of said rock shafts by which said rock shafts may be oscillated to cause movement of said attenuating rotors into and out of meshing relation, and at least one arm of each of said pairs of arms being provided with an abutting face adapted to engage the corresponding arm on the other rock shaft to act as a stop for limiting movement of said rotors toward each other.

3. Apparatus for attenuating streams of molten glass, comprising in combination a pair of intermeshing attenuating rotors provided with substantially radially extending intermeshing projections, a rock shaft for each of said rotors rotatably supported in parallel relation therewith, a pair of bearing arms fixed to each of said rock shafts and spaced apart for rotatably supporting each rotor at its ends and in spaced relation to its associated rock shaft, a pinion fixed to each of said rotors, a pair of intermeshing gears each in mesh with one of said pinions and each rotatably journaled on one of said rock shafts, and means for driving said gears.

4. Apparatus for attenuating streams of molten glass, comprising in combination a pair of intermeshing gear-shaped rotors for engaging streams of viscous glass and attenuating said streams, a pair of rotatably mounted rock shafts each having spaced bearing arms fixed thereon adapted to support one of said rotors in spaced relation to its associated rock shaft, a pinion on each of said rotors, a first gear in mesh with one of said pinions and having a third pinion fixed thereto, said first gear and said third pinion being mounted for rotation on one of said rock shafts, a power driven shaft, a second gear fixed on said shaft and in meshing relation with said third pinion, and a third gear mounted for rotation on the other rock shaft and meshing with said first gear and with the other of said pinions on said attenuating rotors.

5. In apparatus of the character described, the combination of a base, a pair of housings having inner walls and being fixed to said base and extending therefrom in spaced relation with each other, a pair of rock shafts extending across the space between said housings and into said housings and journaled in bearings in the walls thereof, a pair of coacting attenuating rotors in the space between said housings and provided with end journal portions extending into said housings through arcuate slots in the inner walls of said housings, bearings for the attenuating rotor journals within said housings carried on arms fixed to each of said rock shafts and adapted to rotatably support each of said rotors in spaced relation to its associated rock shaft, intermeshing gears on said rock shafts and within one of said housings to cause said rock shafts to move angularly in consonance in opposite directions, and a hand lever on one of said rock shafts at the outside of one of said housings whereby said rock shafts may be oscillated to move said attenuating rotors into and out of coacting relation.

GAMES SLAYTER.